Patented May 5, 1942

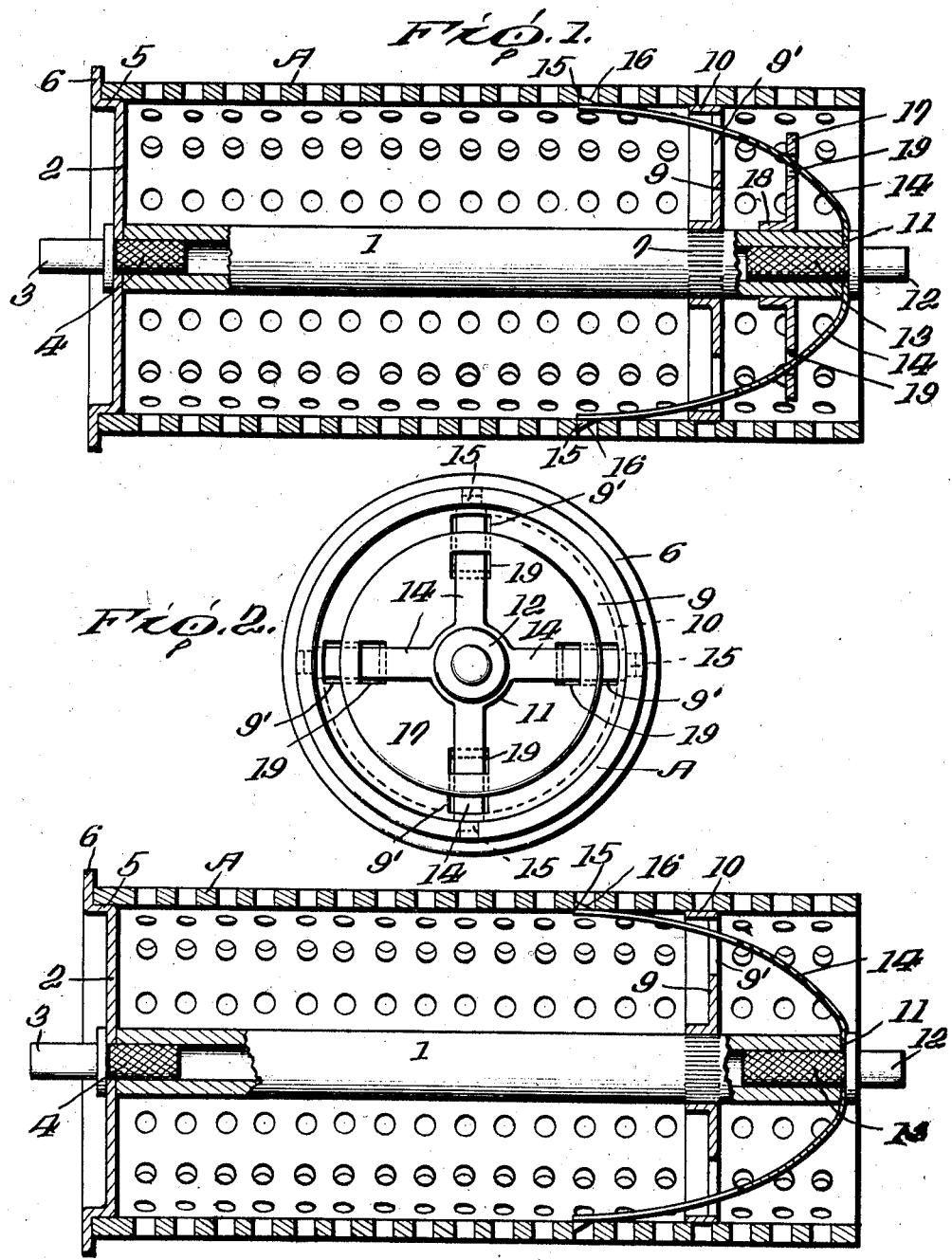

2,281,983

UNITED STATES PATENT OFFICE 2,281,983

SELF-LOCKING ARBOR FOR TUBES AND SPOOLS OR THE LIKE

George B. Markle, Jr., Butler Township, Luzerne County, Pa.

Application March 7, 1941, Serial No. 382,247

8 Claims. (Cl. 242—130)

This invention relates to certain new and useful improvements in a self-locking arbor for supporting tubes forming headless spools or the like, the object being to provide an arbor having a plurality of spring arms having projections at their ends adapted to extend into the perforations of the spool when positioned on the arbor for locking the spool thereon.

Another object of my invention is to provide the arbor with means for moving the arms out of contact with the spool to release the same so that the spool can be removed therefrom.

Another object of my invention is to provide an arbor which is exceedingly simple in construction and very durable in use, the arms being so mounted that they will engage the spool in such a manner as to cause the spool to rotate therewith.

Other novel features of the invention will be hereinafter set forth in the appended claims.

In the drawing:

Fig. 1 is a longitudinal section through an arbor constructed in accordance with my invention showing a spool in position thereon.

Fig. 2 is an end view of the arbor.

Fig. 3 is a longitudinal section through an arbor with the releasing member removed.

In carrying out my invention I employ a central tubular metal core 1 having secured against one end an apertured circular head 2 by a flanged collet 3. The collet is provided with knurled portion 4 adapted to be forced into the open end of the core to securely fasten the head into position on the core. The head 2 is formed of a metal disc having an annular flange to provide a spool supporting surface 5 and a shoulder 6 to form a stop for the spool.

The core 1 is provided with a knurled portion 7 adjacent its other end over which is forced the hub portion of a circular metal head 9 for securing the head in position on the core. The head is provided with an annular flange 10 forming a spool supporting surface. The head 9 is provided with spaced slots 9' for the purpose hereinafter described.

Secured against the end of the core is the hub portion 11 of a spider by a collet 12 which is provided with an annular flange and a knurled portion 13. The knurled portion is forced into the open end of the core as clearly shown.

The spider is provided with spring arms 14 having projections 15 at their ends in the form of lugs having inclined faces 16 to facilitate the placing of a spool thereon. The spring arms 14 extend through the slots 9' of the head 9 so that they can expand and contract and at the same time form a driving connection to relieve the strain on the arms.

The arbor is adapted to receive and support a perforated spool or the like A, as clearly shown so that it will rotate therewith as an interlocking connection is formed by the arms when the spool is positioned thereon. The arms present inclined surfaces for a spool when being placed thereon. When the end of the spool engages the shoulder 6 the projections of the spring arms extend into the perforations of the spool and lock the spool on the arbor.

Slidably mounted on the core 1 between the spider and head is an operating member 17 in the form of a disc having a hub 18 and openings 19 through which the spring arms 14 extend so that by pressing inwardly on the member 17 the arms will be compressed to draw the projections of the arms out of the perforations of the spool or the like to allow the same to be removed from the arbor.

The spring arms releasing member 17 can be dispensed with as shown in Fig. 3 and a special tool consisting of a ring-like member employed for compressing the arms to move them out of engagement with the spool so that the spool can be removed from the arbor.

In order to allow the arbor to be used with different makes of spools having perforations arranged in various positions in respect to one another, the arms can be formed of different lengths so that one or more lugs will always be in engagement with one or more of the perforations and the other lugs will be in frictional engagement with the inner wall of the spool to aid in the driving of the same.

While I have shown and described the arbor used to drive a perforated spool or the like, it is of course understood that the arbor could be used to drive an unperforated spool, solely by the frictional engagement of the lugs in a reverse direction with the inner wall of the spool, to keep the spool centered.

From the foregoing description it will be seen that I have provided an arbor for supporting and automatically locking a headless spool or the like thereon in such a manner that it is held firmly in position on the arbor and rotates therewith.

I claim:

1. An arbor for spools and the like comprising a core having spaced heads secured thereon, one of said heads being provided with a flange forming a stop for the spool when placed thereon, a plurality of spring arms disposed between said heads having projections at their ends adapted to enter the perforations of a perforated spool when placed in position on the heads of said arbor for interlocking said spool to said arbor.

2. An arbor for spools and the like comprising a core having spaced heads secured thereon, a plurality of spring arms secured to one end of said core having their free ends disposed between said heads having projections at their ends adapted to enter the perforations of a perforated spool when placed in position on the heads of said arbor for interlocking said spool to said arbor, and means slidably mounted in respect to said arms for compressing said arms to disengage the projections of said arms from said spool.

3. An arbor for spools and the like comprising a tubular core, spaced flanged metal heads secured on said core, one of said heads being provided with spaced apertures, and a plurality of spring arms secured to one end of said core extending inwardly through the apertures of said head having projections at their ends for interlocking with a spool when placed in position on said heads.

4. An arbor for spools and the like comprising a tubular core, spaced flanged metal heads secured on said core, one of said heads being provided with spaced apertures, a plurality of spring arms secured to one end of said core extending inwardly through the apertures of said head having projections at their ends for interlocking with a spool when placed in position on said heads, and means slidably mounted on said core for moving said arms out of engagement with the spool.

5. An arbor for spools and the like comprising a tubular core, spaced flanged metal heads secured on said core, one of said heads being provided with spaced apertures, a plurality of spring arms carried by said core extending through the apertures of said head having projections at their ends for interlocking with a spool when placed in position on said heads, and a disc movably mounted on said core having openings through which said arms pass for moving said arms out of engagement with said spool.

6. In a device of the kind described, in combination with a tubular perforated spool or the like, an arbor adapted to support the same and to rotate therewith one of said heads being provided with an annular flange forming a stop for the spool, said arbor comprising a central core carrying spaced circular spool supporting surfaces, a plurality of spring arms carried by said core having projections at their ends adapted to enter the perforations of the spool for holding said spool on said arbor and to prevent relative rotation between said arbor and said spool and means carried by said arbor for moving said arms out of interlocking connection with said spool.

7. An arbor for spools or the like, comprising a core having spaced heads secured thereon, one of said heads being provided with a plurality of slots, a plurality of spring arms carried by said core extending inwardly through the slots of said head having projections at their ends for locking a spool in position on said arbor to rotate therewith.

8. An arbor for spools or the like comprising a tubular core provided with spaced heads for supporting the spool or the like, a spider having a hub portion arranged over one end of the core and provided with inwardly extending spring arms for engaging and locking a spool on the arbor, flanged collets arranged in the open ends of said core, one of said collets extending through the hub of said spider for fastening said spider on the end of said core.

GEORGE B. MARKLE, Jr.